United States Patent
Clauss et al.

(10) Patent No.: US 9,539,901 B1
(45) Date of Patent: Jan. 10, 2017

(54) METHOD AND SYSTEM FOR PROVIDING SPEED LIMIT ALERTS

(71) Applicant: STATE FARM MUTUAL AUTOMOBILE INSURANCE COMPANY, Bloomington, IL (US)

(72) Inventors: Mark E. Clauss, Bloomington, IL (US); Steve J. Balbach, Bloomington, IL (US); Craig Cope, Bloomington, IL (US); Jeff Riblet, Normal, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

(21) Appl. No.: 14/699,582

(22) Filed: Apr. 29, 2015

(51) Int. Cl.
*G01C 21/36* (2006.01)
*B60K 31/18* (2006.01)
*G08B 21/18* (2006.01)
*G08B 7/06* (2006.01)
*G08G 1/052* (2006.01)
*G08G 1/0967* (2006.01)

(52) U.S. Cl.
CPC ........... *B60K 31/18* (2013.01); *G01C 21/3697* (2013.01); *G08B 7/06* (2013.01); *G08B 21/182* (2013.01); *G08G 1/052* (2013.01); *G08G 1/0967* (2013.01)

(58) Field of Classification Search
CPC .. G01C 21/3697; G08G 1/052; G08G 1/0967; G08G 1/096741
See application file for complete search history.

(56) References Cited

U.S. PATENT DOCUMENTS

| | | | | |
|---|---|---|---|---|
| 5,383,128 | A * | 1/1995 | Nishida | G01C 21/26 340/990 |
| 2007/0001830 | A1* | 1/2007 | Dagci et al. | 340/438 |
| 2007/0115113 | A1* | 5/2007 | Wang | 340/539.13 |
| 2007/0216521 | A1* | 9/2007 | Guensler | G08G 1/0104 340/439 |
| 2010/0312446 | A1* | 12/2010 | Schofield et al. | 701/70 |
| 2011/0187547 | A1* | 8/2011 | Kweon | 340/670 |
| 2011/0301802 | A1* | 12/2011 | Rupp | G08G 1/0112 701/408 |

(Continued)

OTHER PUBLICATIONS

U.S. Appl. No. 14/269,490 entitled "System and Method to Monitor and Alert Vehicle Operator of Impairment," filed May 5, 2014.

*Primary Examiner* — Hongmin Fan
(74) *Attorney, Agent, or Firm* — Marshall, Gerstein & Borun LLP; Randall G. Rueth

(57) ABSTRACT

A method and system may provide speed limit alerts to users driving in vehicles. A user's client device such as a smart-phone, smart watch, or tablet computer, may provide visual, audible, and/or haptic alerts to the user when the user exceeds a posted speed limit by more than a threshold amount. For example, when the user exceeds the posted speed limit by more than the threshold amount, the user's smart-phone may play a beeping sound and may announce the posted speed limit to the user. Moreover, the user's smart-phone may display an indication of the posted speed limit and a graphic notifying the user the she has exceeded the posted speed limit by more than the threshold amount. A map of a geographic area including the user's travelled route may also be displayed, with annotated areas along the route where the user exceeded the posted speed limit by more than the threshold amount.

20 Claims, 8 Drawing Sheets

(56) References Cited

U.S. PATENT DOCUMENTS

| | | | |
|---|---|---|---|
| 2013/0158849 A1* | 6/2013 | Maura | G01C 21/3697 701/123 |
| 2014/0253309 A1* | 9/2014 | Faeuster et al. | 340/438 |
| 2015/0153198 A1* | 6/2015 | Rothschild | 340/441 |

* cited by examiner

METHOD AND SYSTEM FOR PROVIDING SPEED LIMIT ALERTS

TECHNICAL FIELD

The present disclosure generally relates to systems and methods for providing speed limits alerts in a vehicle and, more particularly to providing visual, audible, and haptic alerts to a user when the user exceeds the posted speed limit by more than a threshold amount.

BACKGROUND

Today, many drivers are distracted and/or unaware of posted speed limits. Modern vehicles come equipped with any number of distractions including stereos, air-conditioners, navigation systems, etc. Furthermore, a vehicle operator can be distracted by another passenger or by articles the vehicle operator brings into the vehicle (e.g., a mobile telephone, a newspaper, a magazine, a book, etc.). Many speeding violations are a result of drivers not being aware of how fast they are driving or of the posted speed limit.

SUMMARY

To provide speed limit alerts to a user, a speed limit alert system may obtain a selection from the user of a threshold speed above the posted speed limit (speed limit threshold) for which the user would like to receive alerts. If the user exceeds this speed limit threshold in a vehicle, the speed alert system may provide an audible, visual, and/or haptic alert to the user via a client device and/or the head unit of the vehicle. For example, the audible alert may include a beeping sound, an engine revving noise, an alarm sound, etc., followed by an electronic voice announcement of the posted speed limit at the user's current location. The visual alert may include an indication of the posted speed limit at the user's current location on the display of the client device and/or the vehicle head unit having a background color such as a red background color to indicate that the user has exceeded the speed limit threshold. The speed limit alert system may activate automatically upon entering and/or travelling in a vehicle.

In this manner, users may be made aware of their current speed and of posted speed limits in a non-distracting fashion, which may reduce the frequency in which drivers' speed, reduce the number of vehicle accidents, and increase driver safety. While current map displays which include posted speed limits may be difficult to read and distracting to a driver, reducing any increase in driver safety from displaying a posted speed limit, the present embodiments advantageously allow for a user to be made aware of her current speed in relation to the posted speed limit in a non-distracting manner. Further, by automatically activating each time the user enters and/or travels in a vehicle, the present embodiments advantageously further reduce driver distraction by removing the need for the user to turn on an application while driving, if the user forgets to activate the application beforehand.

Moreover, the speed limit alert system may continuously monitor and record the speed of the vehicle (vehicle speed) over the course of a vehicle trip, and may display a map of a geographic area including the user's route which may be annotated with indications of the vehicle speed at different locations along the route. For example, the map may include a first indication that the user was driving below the posted speed limit at a first location, a second indication that the user was driving above the posted speed limit but below the speed limit threshold at a second location, and a third indication that the user was driving above the speed limit threshold at a third location. Each indication may be displayed overlaying the corresponding location on the map on the client device and/or the vehicle head unit. In this manner, a user may review the amount of time and locations where he was speeding during a vehicle trip. This information may further increase a user's awareness of his propensity for speeding, which may cause the user to adjust his driving habits.

In an embodiment, a computer-implemented method for providing speed limit alerts in a vehicle is provided. The method includes obtaining, at a client device, an indication of a threshold speed above a posted speed limit for providing an alert to a user, determining a current location of the user when the user is travelling in a vehicle on a vehicle trip, obtaining a posted speed limit for the vehicle based on the current location of the user, and determining a speed of the vehicle. When the vehicle exceeds the threshold speed above the posted speed limit, the method may include providing an audible alert to the user, and providing a visual alert to the user, where the visual alert includes a display on a user interface with an indication that the vehicle is exceeding the threshold speed above the posted speed limit. The method may be automatically initiated when the user begins travelling in the vehicle.

In another embodiment, a client device for providing speed limit alerts in a vehicle is provided. The client device includes one or more processors, a communication network, a user interface, and a non-transitory computer-readable memory coupled to the one or more processors, the communication network, and the user interface, and storing instructions thereon. When executed by the one or more processors, the instructions cause the client device to obtain an indication of a threshold speed above a posted speed limit for providing an alert to a user, determine a current location of the user when the user is travelling in a vehicle on a vehicle trip, obtain, via the communication network, a posted speed limit for the vehicle based on the current location of the user, and determine a speed of the vehicle. When the vehicle exceeds the threshold speed above the posted speed limit, the instructions cause the client device to provide an audible alert to the user, and provide a visual alert to the user, wherein the visual alert includes a display on the user interface with an indication that the vehicle is exceeding the threshold speed above the posted speed limit. The instructions may be automatically executed by the one or more processors on the client device when the user begins travelling in the vehicle.

BRIEF DESCRIPTION OF THE DRAWINGS

The figures described below depict various aspects of the system and methods disclosed therein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

DETAILED DESCRIPTION

Figure 1:
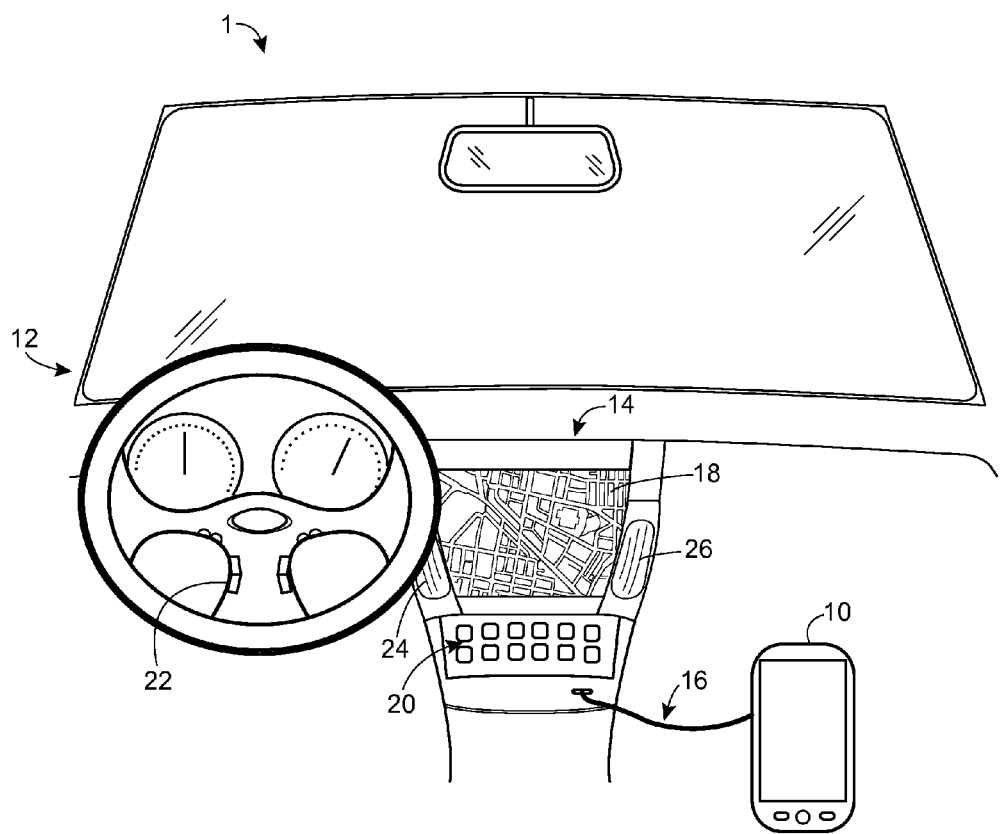
FIG. 1 illustrates an example vehicle in which the techniques of the present disclosure can be used to provide speed limit alerts.

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Accordingly, as used herein, the term "vehicle" may refer to any of a number of motorized transportation devices. A vehicle may be a car, truck, bus, train, boat, plane, motorcycle, snowmobile, other personal transport devices, etc. As used herein, a "vehicle trip" means one use of a vehicle to travel from a departure location to a destination location. The departure and destination locations may be the same location, such as where a user travels from a departure location to a third point and then travels back to the departure location in the vehicle. The departure and destination locations may alternatively be different locations, such as where a user travels from a departure location to a different destination location in the vehicle. A vehicle trip may include one or more stops along the route of the vehicle between the departure location and the destination location.

Generally speaking, techniques for providing speed limit alerts may be implemented in a client device, a vehicle head unit, one or several network servers or a system that includes a combination of these devices. However, for clarity, the examples below focus primarily on an embodiment in which a speed alert server generates and transmits map data to a user's client device representing a user's travelled route and including posted speed limits corresponding to the user's locations along the travelled route. The speed limit alert server may also generate and transmit application screens or portions of application screens to the user's client device, and in turn, the client device may provide audible, visual, and/or haptic alerts to the user via the application screens and based on the map data. Additionally, the client device may determine the location and speed of the vehicle for deciding whether to provide an alert. In other embodiments, the client device may provide instructions to a vehicle head unit to provide the audible, visual, and/or haptic alert to the user.

Referring to FIG. 1, an example environment 1 in which the techniques outlined above can be implemented includes a client device 10 and a vehicle 12 with a head unit 14. The client device 10 may include, by way of example, various types of "mobile devices," such as a tablet computer, a cell phone, a personal digital assistant (PDA), a smart-phone, a laptop computer, a desktop computer, a portable media player, a home phone, a pager, a wearable computing device, smart glasses, smart watches or bracelets, phablets, other smart devices, devices configured for wired or wireless RF (Radio Frequency) communication, etc. Additionally, any client device appropriately configured may interact with the speed limit alert system. Moreover, while the example environment 1 includes one client device 10, any number of client devices 10 may be included in the example environment 1 such that two or more client devices may communicate with each other to provide speed limit alerts. For example, a first client device 10, such as a smart-phone may communicate with a second client device 10, such as a wearable computing device to request the wearable computing device to provide an audible alert and/or a haptic alert when the smart-phone determines that an alert should be provided to the user.

In any event, the client device 10 may communicate with the head unit 14 of the vehicle 12 (vehicle head unit) via a communication link 16, which may be wired (e.g., Universal Serial Bus (USB)) or wireless (e.g., Bluetooth, Wi-Fi Direct). The client device 10 also can communicate with various content providers, servers, etc., via a wireless communication network such as a fourth- or third-generation cellular network (4G or 3G, respectively), a Wi-Fi network (802.11 standards), a WiMAX network, a wide area network (WAN), a local area network (LAN), etc.

In some instances, the client device 10 may communicate with the wireless communication network via wireless signals and, in some instances, may communicate with the wireless communication network via an intervening wireless or wired device, which may be a wireless router, a wireless repeater, a base transceiver station of a mobile telephony provider, etc.

The vehicle head unit 14 can include a display 18 such as a digital map. The display 18 in some implementations is a touchscreen and includes a software keyboard for entering text input, which may include the name or address of a destination, point of origin, etc. Hardware input controls 20 and 22 on the vehicle head unit 14 and the steering wheel, respectively, can be used for entering alphanumeric characters or to perform other functions for requesting navigation directions. The vehicle head unit 14 also can include audio input and output components such as a microphone 24 and speakers 26, for example. The speakers 26 can be used to play the audible alert sent from the client device 10, such as sounds and/or voice announcements.

Figure 2:
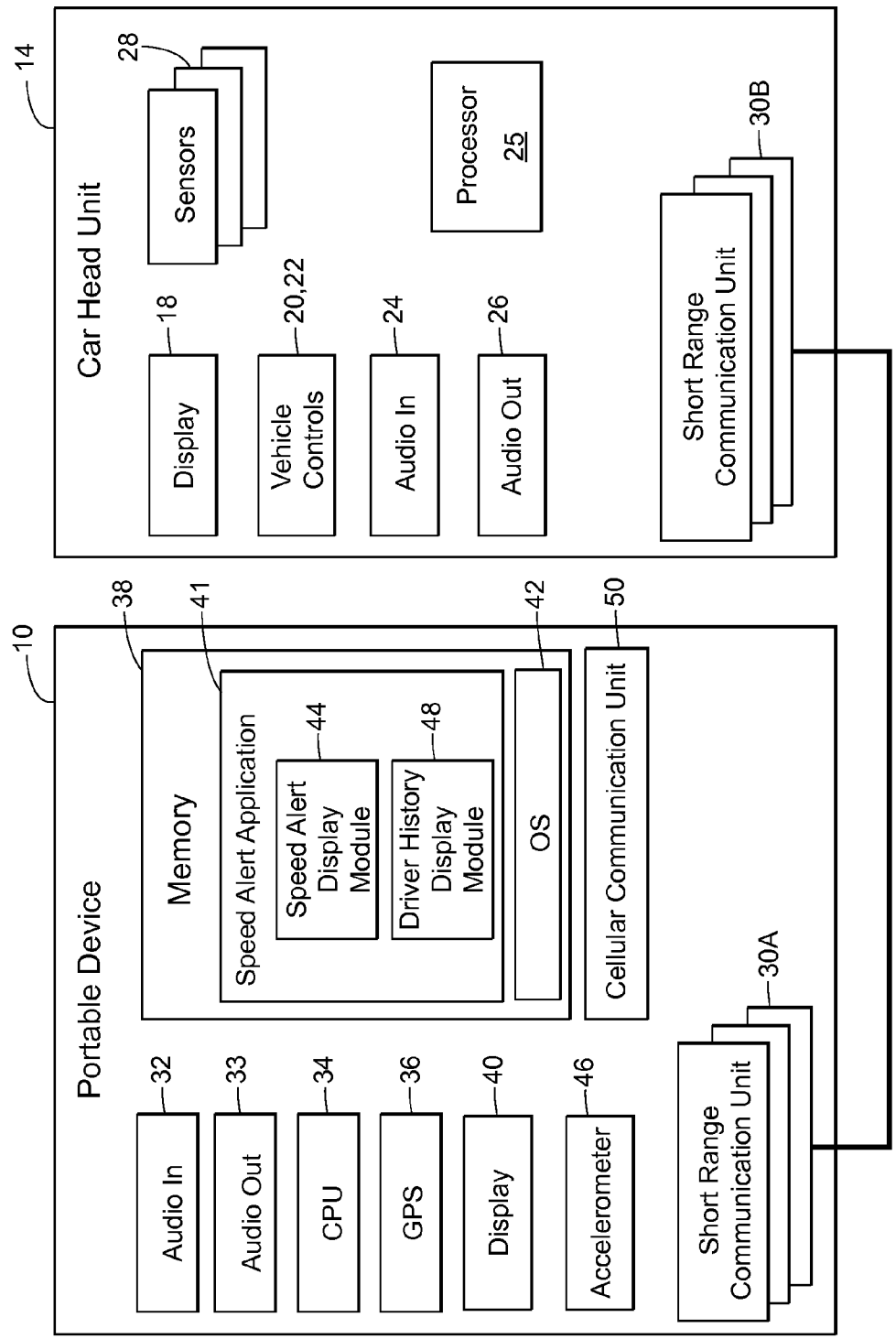
FIG. 2 illustrates a block diagram of an exemplary client device and an exemplary vehicle head unit that can operate in the system of FIG. 1.

An example implementation of the client device 10 and the vehicle head unit 14 is discussed next with reference to FIG. 2. As discussed above, the vehicle head unit 14 may include a display 18, hardware controls 20, 22, an audio input unit 24, and an audio output unit 26. The vehicle head unit 14 also may include a processor 25, a set of one or several sensors 28, and one or several short-range communication units 30B. The set of sensors 28 may include, for example, a global positioning system (GPS) module to determine the current position of the vehicle in which the vehicle head unit 14 is installed, an inertial measurement unit (IMU) to measure the speed, acceleration, and current orientation of the vehicle, etc. Although FIG. 2 depicts the set of sensors inside the vehicle head unit 14, it is noted that the sensors 28 need not be integral components of the vehicle head unit 14. Rather, a vehicle may include any number of sensors in various locations, and the vehicle head unit 14 may receive data from these sensors during operation.

A short-range communication unit 30B may allow the vehicle head unit 14 to communicate with the client device 10. The short-range communication unit 30B may support wired or wireless communications, such as USB, Bluetooth, Wi-Fi Direct, Near Field Communication (NFC), etc. The processor 25 may operate to format messages transmitted between the vehicle head unit 14 and the client device 10, process data from the sensors 28 and the audio input 24, display map images via the display 18, play audio via the audio output 26, etc.

The client device 10 may include a short-range communication unit 30A for communicating with the vehicle head unit 14. Similar to the unit 30B, the short-range communication unit 30A may support one or more communication schemes such as USB, Bluetooth, Wi-Fi Direct, NFC, etc. The client device 10 may include a display 40 and audio input and output components such as a microphone 32 and speakers 33. Additionally, the client device 10 may include one or more processors or CPUs 34, a GPS module 36, a memory 38, an accelerometer 46 to measure the acceleration of the client device 10, a gyroscope (not shown) to measure the orientation of the client device 10, a vibration motor (not shown) for causing the client device 10 to vibrate, and a cellular communication unit 50 to transmit and receive data via a 3G cellular network, a 4G cellular network, or any other suitable network. The client device 10 can also include additional sensors or, conversely, the client device 10 can rely on sensor data supplied by the vehicle head unit 14. In one implementation, to improve accuracy during real-time navigation, the client device 10 relies on the positioning and speed data supplied by the vehicle head unit 14 rather than on the output of the GPS module 36.

The memory 38 may be tangible, non-transitory memory and may include any types of suitable memory modules, including random access memory (RAM), read-only memory (ROM), flash memory, other types of persistent memory, etc. The memory 38 may store, for example instructions executable on the processors 34 of an operating system 42, a speed alert application 41, a speed alert display module 44, and a driver history display module 48.

The speed alert application 41 may transform user data, map data received from a speed alert server as described in FIG. 3 below, and/or sensor data to display/play visual, audible, and/or haptic alerts. The speed alert application 41 may also transform the user data, map data, and/or sensor data to display a map of a geographic area including the user's travelled route which may be annotated with indications of the vehicle speed at different locations along the route. The speed alert application 41 may be a single module or may include a plurality of modules such as the speed alert display module 44 and the driver history display module 48. While the speed alert application 41 is depicted in FIG. 2 as including two modules 44 and 48, the speed alert application 41 may include any number of modules accomplishing tasks related to implementation of the client device 10.

The speed alert display module 44 may generate visual, audible, and/or haptic alerts based on the user's current location, the posted speed limit for that location, and the user-specified speed limit threshold. These respective alerts can be displayed and/or played via the display 40, the speakers 33, or the vibration motor (not shown) of the client device 10 or of a second client device 10. The driver history display module 48 may obtain map data corresponding to the user's travelled route, and may display a map of a geographic area including the user's travelled route with indications of the vehicle speed compared to the speed limit threshold at different locations on the map. For example, each indication may correspond to a speed category selected from several speed categories. A green color may indicate that the user is travelling at a first speed category, below the posted speed limit, a yellow color may indicate that the user is travelling at a second speed category, above the posted speed limit but below the speed limit threshold, a red color may indicate that the user is travelling at a third speed category, above the speed limit threshold, and a gray color may correspond to a fourth speed category, that there is no speed limit data for the user's current location. During or after a vehicle trip, the driver history display module 48 may display the map of a geographic area including the user's travelled route on the client device 10, for the user to see the amount of time and locations in which she travelled at each speed category. Additionally, the driver history display module 48 may also record the percentage of time and/or distance in which the user travelled at each speed category, and may include indications of each percentage on the display.

In some embodiments, the speed alert application 41 may invoke a vehicle communication API (such as Apple CarPlay™) to display map data and visual alerts or to play audible alerts via the display 18 and the audio output 26, respectively, of the vehicle head unit 14. More generally, by invoking the vehicle communication API, the speed alert application 41 may transfer information from the client device 10 to the vehicle head unit 14 and/or may control operation of input/output devices in the vehicle head unit 14, such as the display 18 and the audio output 26. The software components 42, 44, and 48 can include compiled instructions and/or instructions in any suitable programming language interpretable at runtime. In any case, the software components 42, 44, and 48 execute on the one or more processors 34.

Figure 3:
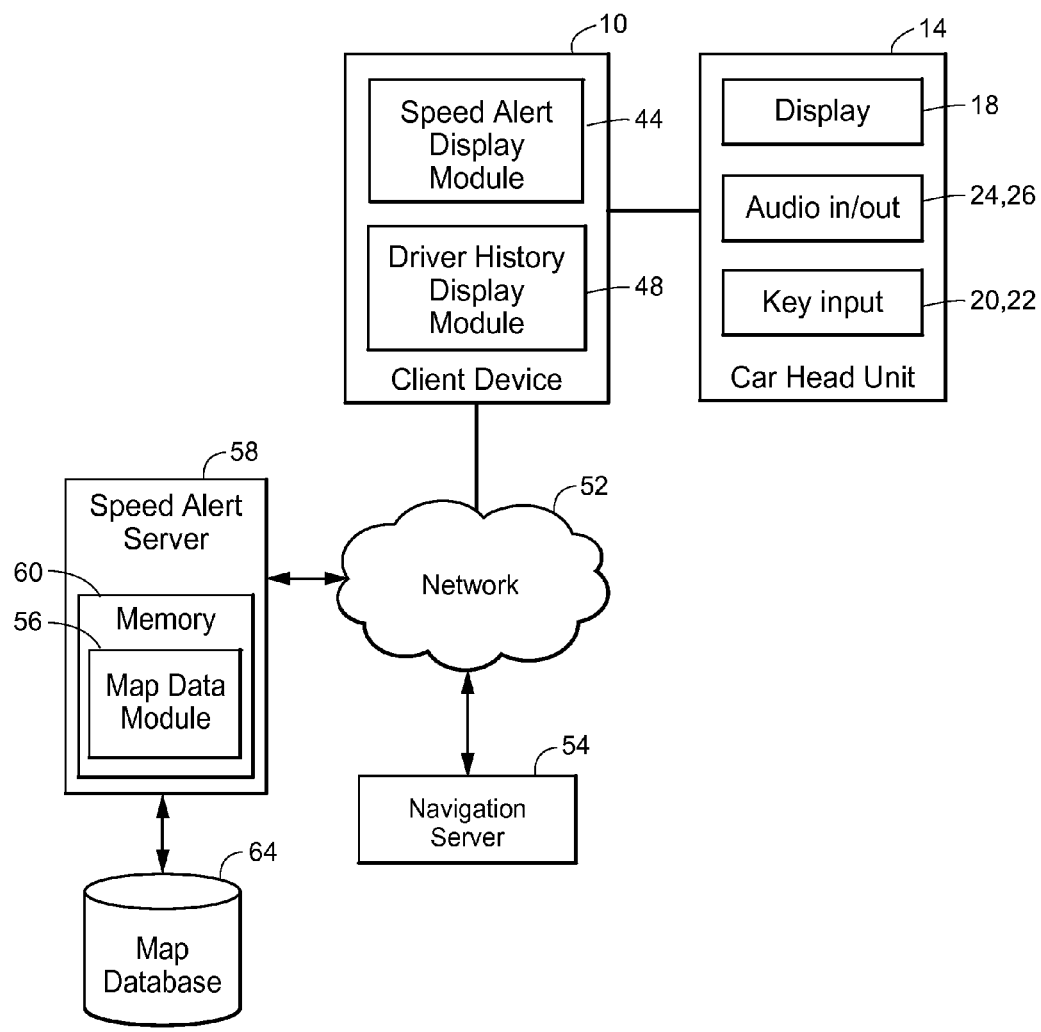
FIG. 3 illustrates a block diagram of a computer network and system on which an exemplary speed limit alert system may operate in accordance with the presently described embodiments.

FIG. 3 illustrates an example communication system in which the client device 10 can operate to obtain map data corresponding to the user's travelled route which may include posted speed limits. For ease of illustration, the client device 10 and the vehicle head unit 14 are illustrated in FIG. 3 in a simplified manner, without some of the components illustrated in FIG. 3 and/or discussed elsewhere in this disclosure.

The client device 10 may have access to a wide area communication network 52 such as the Internet via a long-range wireless communication link (e.g., a cellular link). Referring back to FIG. 2, the client device 10 can access the communication network 52 via the cellular communication unit 50. In the example configuration of FIG. 3, the client device 10 may communicate with a speed alert server 58 which may provide map data via a map data module 56 and may generate and/or transmit application screens or web pages to the client device 10. The client device 10 may also communicate with a navigation server 54 that provides navigation data.

With reference to FIG. 2, in some implementations the speed alert display module 44 and/or the driver history display module 48 can be a part of the speed alert server 58, the client device 10, or a combination of the speed alert server 58 and the client device 10. Although only one speed alert server 58 is depicted in FIG. 3, multiple speed alert servers 58 may be provided for the purpose of distributing server load, serving different web pages, etc. These multiple speed alert servers 58 may include a web server, an entity-specific server (e.g. an Apple® server, etc.), a server that is disposed in a retail or proprietary network, etc. For example, the map data module 56 may be a part of a map data server which may communicate with the speed alert server 58, and/or a first speed alert server may include the map data module 56 and a second speed alert server 58 may include a web server or application server for generating and transmitting web pages or application screens.

The speed alert server 58 may include a controller. The controller may include a program memory 60, a microcontroller or a microprocessor (MP), a random-access memory (RAM), and/or an input/output (I/O) circuit, all of which may be interconnected via an address/data bus. In some embodiments, the controller may also include, or otherwise be communicatively connected to, a database or other data storage mechanism (e.g., one or more hard disk drives, optical storage drives, solid state storage devices, etc.), such as the map database 64. The map database 64 may include map data for roads, highways, cities, states, countries, etc., throughout the world. The map database 64 may also store posted speed limits corresponding to each road, highway, etc., or each portion thereof (e.g., mile marker 1 for Route 66 may have a posted speed limit of 65 miles per hour (mph), whereas mile marker 50 for Route 66 may have a posted speed limit of 55 mph). The controller may also include, or otherwise be communicatively connected to, a database which stores user data such as speed limit thresholds for each user, web page templates and/or web pages, application screen templates and/or application screens, and other data necessary to interact with users. The controller may implement the RAM(s) and/or the program memories as semiconductor memories, magnetically readable memories, and/or optically readable memories, for example.

The program memory 60 and/or the RAM may store various applications for execution by the microprocessor.

For example, the map data module 56 may retrieve map data for a geographic area, which may include the user's travelled route and posted speed limits from the map database 64, in response to receiving the user's current location from the client device 10. The program memory 60 may also include a server application which may obtain the map data including posted speed limits for the user's travelled route to generate and/or transmit speed limit alert displays and driver history displays to the client device 10, which may be displayed via the speed alert application 41.

For example, in some embodiments, the speed alert server 58 may receive the user's current location from the client device 10, and the map data module 56 may retrieve map data for a geographic area including the current location and a posted speed limit for the current location. A server application included in the speed alert server 58 may generate and transmit a speed limit alert display including an indication of the posted speed limit for the user's current location. In some embodiments, the server application may also generate several background colors for the speed limit alert display each corresponding to a speed category. For example, the server application may generate a green background color corresponding to a first speed category (e.g., that the user is travelling below the posted speed limit), a yellow background color corresponding to a second speed category (e.g., that the user is travelling above the posted speed limit but below the speed limit threshold), a red background color corresponding to a third speed category (e.g., that the user is travelling above the speed limit threshold), and a gray background color corresponding to a fourth speed category (e.g., that there is no speed limit data for the user's current location).

The server application may transmit each of these background colors to the client device 10 with instructions to display one of the background colors on the speed limit alert display based on the current speed of the vehicle, the posted speed limit, and the speed limit threshold. The client device 10, via the speed alert application 41, may obtain the speed limit threshold from the user, may retrieve a previously stored speed limit threshold, or may obtain a default speed limit threshold stored at the client device 10. In any event, the client device 10 may determine the speed of the vehicle, for example from the sensors in the client device 10 or the vehicle head unit 14, and may select one of the background colors by comparing the speed of the vehicle to the posted speed limit and the speed limit threshold to determine the speed category for the user at the user's current location. The client device 10 may then display the selected background color and speed limit alert display, via the speed alert application 41, on the client device 10 and/or on the display 18 of the vehicle head unit 14.

Also, in some embodiments, the speed alert server 58 may transmit the map data for the current location to the client device 10. In turn, the client device 10 may compare the speed of the vehicle to the speed limit threshold based on the posted speed limit for the user's current location. If the user exceeds the speed limit threshold, the client device 10 may generate the audible, visual, and/or haptic alerts. Moreover, the speed alert server 58 may generate and transmit a driver history display including a map of a geographic area which may include the user's travelled route based on map data retrieved for each of the user's locations on the travelled route. The speed alert server 58 may also transmit posted speed limits at each of the user's locations on the travelled route. Additionally, instructions to annotate the map by overlaying an indicator over each of the user's locations on the travelled route may be transmitted, where each indicator corresponds to a speed category.

For example, the indicator may be a color selected from several colors where a green color may indicate that the user is travelling at a first speed category, below the posted speed limit, a yellow color may indicate that the user is travelling at a second speed category, above the posted speed limit but below the speed limit threshold, a red color may indicate that the user is travelling at a third speed category, above the speed limit threshold, and a gray color may correspond to a fourth speed category, that there is no speed limit data for the corresponding location. The client device 10 may record the speed of the vehicle at each location on the travelled route, and may select an indicator to overlay at each location on the map based on the speed of the vehicle, the posted speed limit corresponding to the location, and the speed limit threshold. The client device 10 may then display the driver history display on the client device 10 and/or the display 18 of the vehicle head unit 14 (e.g., by invoking the vehicle communication API).

More generally, the client device 10 can communicate with any number of suitable servers. For example, in another embodiment, the navigation server 54 may provide directions and other navigation data while a traffic data server may provide traffic updates along the route, a weather data server may provide weather data and/or alerts, etc.

FIGS. 4A-E depict an exemplary user configuration display and exemplary speed limit alert displays each corresponding to a different category, which may be generated, at least in part by the speed alert server 58 and displayed by the speed alert display module 44 of the client device 10, and/or provided to the vehicle head unit 14 for display. Each of the exemplary speed limit alert displays may be visual alerts to the user of the speed of the vehicle compared to the posted speed limit and the speed limit threshold. As will be appreciated by those of ordinary skill in the relevant art(s), the exemplary user configuration display and exemplary speed limit alert displays shown in FIGS. 4A-E are for illustrative purposes, and the associated functionality may be implemented using any suitable format and/or design for facilitating corresponding described functionalities without departing from the spirit and scope of the present disclosure. In some embodiments, the speed alert server may transmit web pages.

Figure 4A:
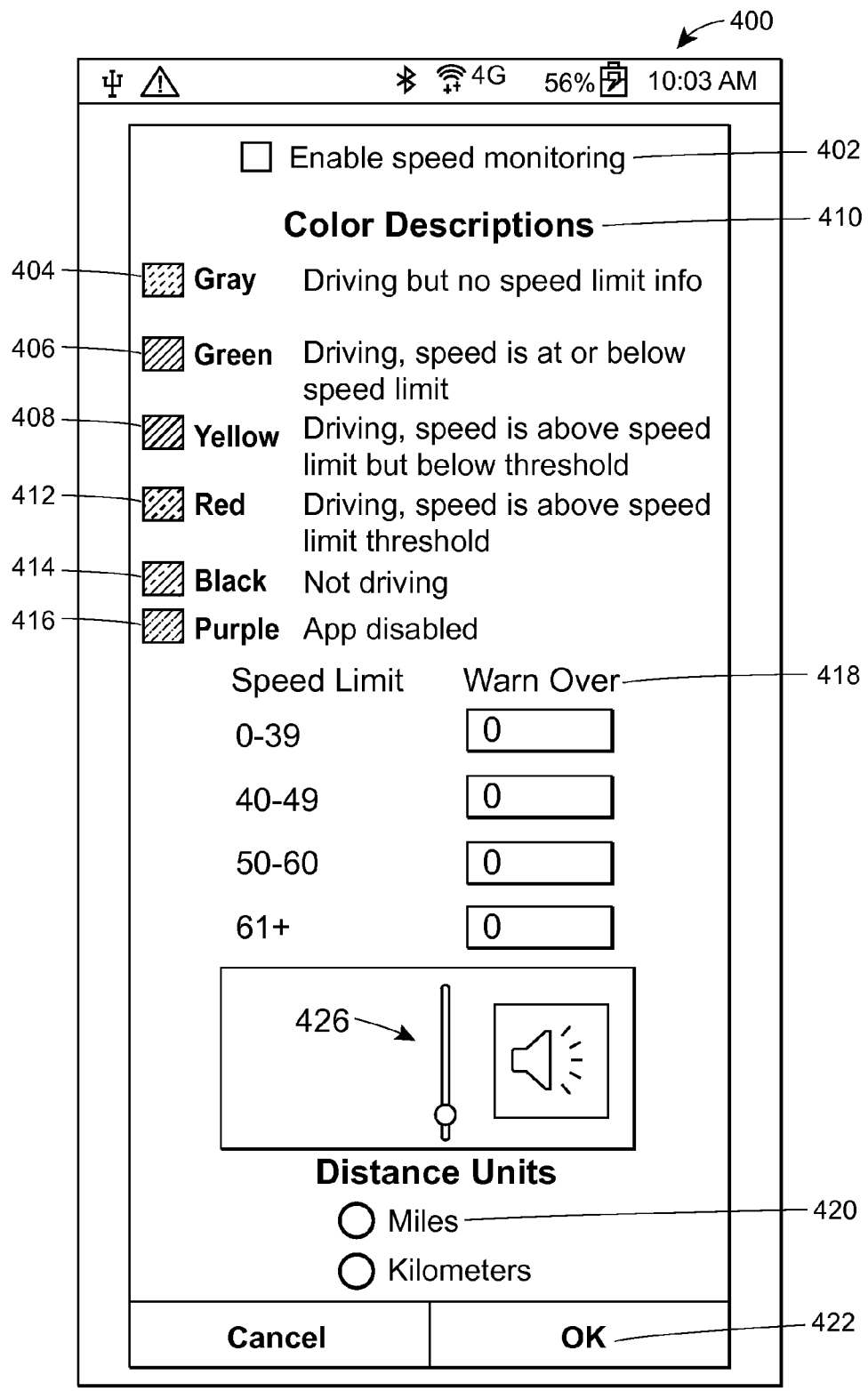
FIG. 4A illustrates an exemplary user configuration display of a speed alert application in accordance with the presently described embodiments.

Before travelling in a vehicle, or when the vehicle has come to a stop, the speed alert application 41 may present a user configuration display on the client device 10 for a user to enable speed alerts and/or monitoring, select speed limit thresholds, configure the visual, audible, and/or haptic alerts, etc. In some embodiments, the speed alert application 41 may not allow the user to adjust settings such as the speed limit thresholds, volume and sound of the audible alerts, or any other user controls on the user configuration display, when the vehicle is in motion. For example, if the speed alert application 41 detects a speed which exceeds a predetermined threshold (e.g. 10 mph), the user may not be allowed to adjust the settings until the vehicle comes to a stop. In any event, FIG. 4A depicts an exemplary user configuration display 400 which may include a user control for enabling speed monitoring 402. The user control 402 may be a checkbox, a radio button, or any other suitable control for selecting an option to "Enable speed monitoring."

By selecting the user control 402 to enable speed monitoring, the speed alert application 41 may automatically activate upon receiving an indication that the client device 10 is travelling in a vehicle. For example, the speed alert application 41 may automatically activate when the client device 10 detects a speed, via the sensors 36, 46, over a predetermined threshold (e.g., 10 mph). In another example, the speed alert application 41 may automatically activate when the client device 10 is within range of the vehicle head unit 14 (e.g., the client device 10 detects an electronic signal from a vehicle head unit via the short-range communication unit 30A, such as a Bluetooth signal, Wi-Fi direct signal, USB, etc.). In yet another example, the speed alert application 41 may automatically activate when the client device 10 detects a speed above the predetermined threshold and the client device 10 is within range of the vehicle head unit 14. Moreover, upon activation, the speed alert application 41 may obtain and record the user's locations and speeds during a vehicle trip, as described in more detail below.

The user configuration display 400 may also include a legend 410 describing several indications (e.g., background colors) and a speed category to which each indication corresponds. For example, the legend 410 explains that a green background color 406 may correspond to a first speed category (e.g., that the user is travelling below the posted speed limit), a yellow background color 408 may correspond to a second speed category (e.g., that the user is travelling above the posted speed limit but below the speed limit threshold), a red background color 412 may correspond to a third speed category (e.g., that the user is travelling above the speed limit threshold), and a gray background color 404 may correspond to a fourth speed category (e.g., that there is no speed limit data for the user's current location). Moreover, the legend 410 also explains that a black background color 414 may indicate that the user is not driving (e.g., when the client device 10 detects a speed that is less than a threshold moving speed, such as 2 mph), and a purple background color 416 may indicate that the speed alert application is disabled.

The user configuration display 400 may also include user controls 418 for selecting one or several speed limit thresholds. As shown in FIG. 4A, the user may select a speed limit threshold for several speed limit ranges. For example, the user may select a speed limit threshold for when the posted speed limit is between 0 and 39 mph, for when the posted speed limit is between 40 and 49 mph, for when the posted speed limit is between 50 and 60 mph, and for when the posted speed limit is greater than 60 mph. In other embodiments, the user may select a single speed limit threshold regardless of the posted speed limit, or may select any suitable number of speed limit thresholds.

If the user selects a speed limit threshold for several speed limit ranges, then the speed alert application 41 may compare the speed of the vehicle to the posted speed limit and the speed limit threshold corresponding to the speed limit range which includes the posted speed limit. For example, if the posted speed limit is 25 mph, then the speed alert application 41 may compare the speed of the vehicle to the 25 mph posted speed limit and the speed limit threshold selected by the user for the speed limit range of between 0 and 39 mph.

In any event, the user controls 418 may be free-form text fields for entering speed limit thresholds, may be drop-down menus for selecting speed limit thresholds (e.g., for selecting a speed limit threshold of 0 mph, 5 mph, 10 mph, 15 mph, or 20 mph above the posted speed limit), or may be any other suitable user controls for selecting speed limit thresholds. As shown in FIG. 4A, there may a default speed limit threshold of 0 mph above the posted speed limit for each speed limit range, so that if the user does not select a speed limit threshold, or does not select a speed limit threshold for a particular speed limit range, the speed limit threshold may default to 0 mph. In other embodiments, the default speed limit threshold may be any other suitable number.

If the user has previously selected speed limit thresholds, the previously selected speed limit thresholds may be displayed on the user configuration display 400, and may be adjusted via the user controls 418. For example, the user may have previously selected a speed limit threshold of 10 mph above the posted speed limit when the posted speed limit is between 40 and 49 mph, by entering "10 mph" into the text field corresponding to 40-49 mph, via the user controls 418. If the user wants to adjust the speed limit threshold to 5 mph above the posted speed limit when the posted speed limit is between 40 and 49 mph, she may delete the "10 mph" entry, and enter "5 mph" instead.

The user configuration display 400 may also include a volume slider bar 426 for selecting the volume of sounds and/or voice announcements in an audible alert. For example, if the ball of the slider bar is near the bottom of the slider bar 426, audible alerts may be very faint. On the other hand, if the ball is near the top of the slider bar 426, audible alerts may be loud. The user may adjust the position of the ball by clicking and dragging the ball along the slider bar, by touch-selecting the ball and dragging, or in any other suitable manner. As mentioned above, in some embodiments, the speed alert application 41 may not allow the user to adjust the volume of audible alerts when the vehicle is moving.

Additionally, a user control 420 such as a radio button may be displayed on the user configuration display 400 for selecting a preferred unit of measurement for displaying/monitoring the vehicle speed. The user may select an option to display/monitor speed in miles per hour or an option to display/monitor speed in kilometers per hour. When the user finishes configuring the speed alert application 41 on the user configuration display 400, she may select an "OK" button 422. In response to selecting the "OK" button 422, the speed alert application 41 may store the user's configuration settings, and may obtain the speed limit thresholds and preferred unit of measurement when displaying speed limit alerts and driver history. In some embodiments, the user's configuration settings may be transmitted and stored at the speed alert server 58.

While the user configuration display 400 includes six indications corresponding to speed categories, this is merely for ease of illustration only. The user configuration display 400 may include any suitable number of indications, any suitable number of speed categories, and each indication may be any suitable background color or any other suitable indication of a speed category.

In any event, if speed monitoring is enabled, the speed alert display module 44 may obtain the user's current location, for example, via the GPS sensors 36 or the GPS sensors 28 in the vehicle head unit 14. The user's current location may then be transmitted to the speed alert server 58 to retrieve map data including the posted speed limit for the user's current location and/or map data/posted speed limits for a geographic area including the user's current location (e.g., within a two mile radius of the user's current location). In turn, the speed alert server 58 may provide the posted speed limit for the user's current location, and/or a speed limit alert display including an indication of the posted speed limit for the user's current location, and several indications (e.g., background colors) each corresponding to a speed category to the client device 10. As described above, a green background color may correspond to a first speed category (e.g., that the user is travelling below the posted speed limit), a yellow background color may correspond to a second speed category (e.g., that the user is travelling above the posted speed limit but below the speed limit threshold), a red background color may correspond to a third speed category (e.g., that the user is travelling above the speed limit threshold), and a gray background color may correspond to a fourth speed category (e.g., that there is no speed limit data for the user's current location). In other embodiments, additional or alternative background colors corresponding to the first, second, third, and fourth speed category may be included. Moreover, additional or alternative background colors may also be included which correspond to additional speed categories.

The speed alert display module 44 may also determine the speed of the vehicle, for example via the GPS sensors 36, the accelerometer 46, and/or the gyroscope in the client device 10 or the GPS sensors and/or IMU 28 in the vehicle head unit 14. Based on the speed of the vehicle, the speed limit threshold, and the posted speed limit for the user's current location, the speed alert display module 44 may determine a speed category and may select one of the several indications corresponding to the speed category. The speed limit alert display may be presented on the client device 10 and/or the vehicle head unit 14.

Figure 4B:
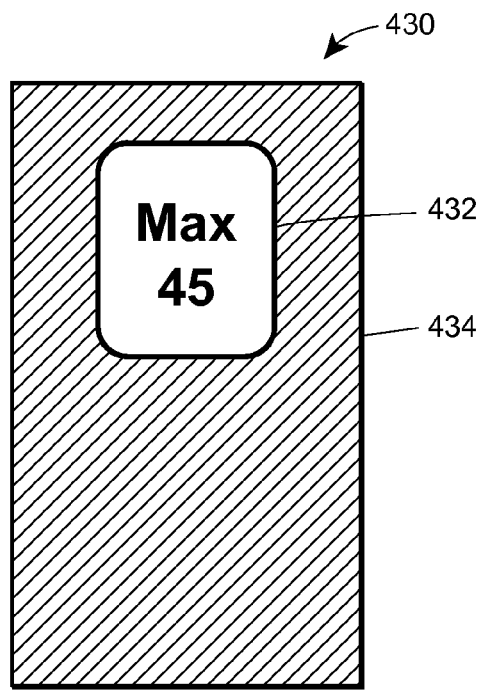
FIG. 4B illustrates a first exemplary speed limit alert display of a speed alert application in accordance with the presently described embodiments.

For example, FIG. 4B depicts a first exemplary speed limit alert display 430. The first speed limit alert display 430 may include an indication of the posted speed limit for the user's current location 432, which may resemble a speed limit sign displaying the posted speed limit, 45 mph. In other embodiments, the posted speed limit may be represented in kilometers per hour, or any other suitable speed metric. The first speed limit alert display 430 may also include a green background color 434, which may correspond to a first speed category that the user is travelling below the posted speed limit. For example, if the speed alert display module 44 obtains a vehicle speed of below 45 mph, the speed alert display module 44 may select the green background color.

Figure 4C:
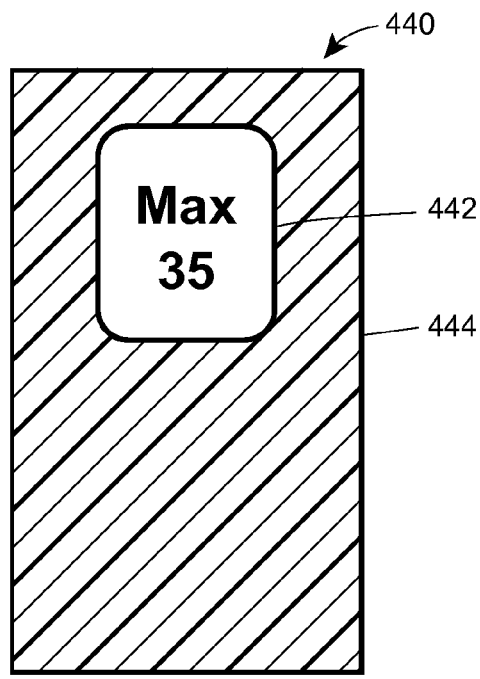
FIG. 4C illustrates a second exemplary speed limit alert display of a client application in accordance with the presently described embodiments.

FIG. 4C depicts a second exemplary speed limit alert display 440, which may include an indication of the posted speed limit for the user's current location 442, similar to the indication of the posted speed limit as shown in FIG. 4B. The indication 442 may resemble a speed limit sign displaying the posted speed limit, 35 mph. The second speed limit alert display 440 may also include a yellow background color 444, which may correspond to a second speed category that the user is travelling above the posted speed limit but below the speed limit threshold. For example, the user may have selected a speed limit threshold of 10 mph over the posted speed limit. If the speed alert display module 44 obtains a vehicle speed of above 35 mph and below 45 mph, the speed alert display module 44 may select the yellow background color.

Figure 4D:
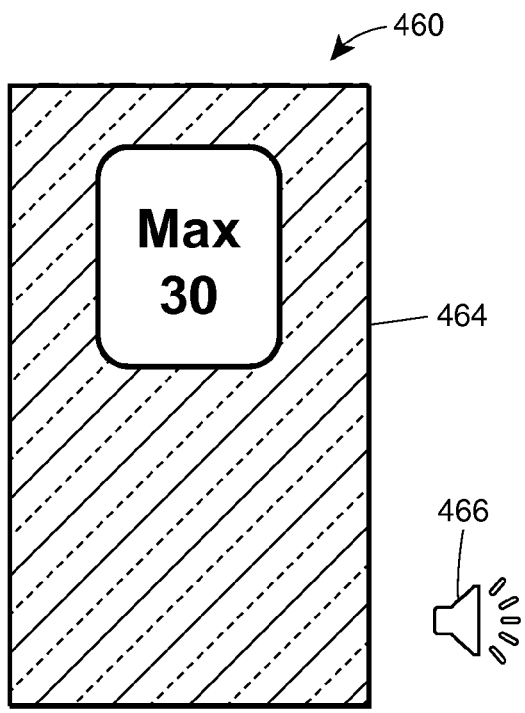
FIG. 4D illustrates a third exemplary speed limit alert display of a speed alert application in accordance with the presently described embodiments.

Additionally, FIG. 4D depicts a third exemplary speed limit alert display 460, which may include an indication of the posted speed limit for the user's current location 462, similar to the indications of the posted speed limits as shown in FIGS. 4B-C. The indication 462 may resemble a speed limit sign displaying the posted speed limit, 30 mph. The third speed limit alert display 460 may also include a red background color 464, which may correspond to a third speed category that the user is travelling above the speed limit threshold. For example, the user may have selected a speed limit threshold of 15 mph over the posted speed limit. If the speed alert display module 44 obtains a vehicle speed of above 45 mph, the speed alert display module 44 may select the red background color.

In some embodiments, the third speed limit alert display 460 may also include a sound indicator 466 indicating that the client device 10 and/or the vehicle head unit 14 may also play an audible alert. In other embodiments, the sound indicator 466 may not be included and an audible alert may be played without displaying the sound indicator 466. The audible alert may be a sound such as a ringtone, a beep, an engine revving noise, etc., followed by a voice announcement of the posted speed limit. For example, the speed alert display module 44 may include a text-to-speech engine, which generates a voice announcement for "The speed limit is 30 mph." In some embodiments, the user may select the sound, for example from a music directory or from a list of ringtones. Additionally, the user may record custom audio clips (e.g., via the microphone 32 as shown in FIG. 2) which may be selected as the sound and/or the audible alert or may import an audio clip. The speed alert display module 44 may provide instructions for the voice announcement and/or the sound to be played out of the speakers 33 of the client device 10 or the speakers 26 of the vehicle head unit 14. In other embodiments, the speed alert display module 44 may provide instructions for the voice announcement and/or the sound to be played out of the speakers of a second client device 10, such as a wearable computing device (e.g., smart glasses, a smart watch, a smart bracelet, etc.).

In some embodiments, the audible alert may be played when the speed of the vehicle exceeds the speed limit threshold. In other embodiments, the audible alert may also be played when the speed of the vehicle exceeds the posted speed limit or in any other suitable scenario. For example, in an embodiment, the speed alert display module 44 may generate a voice announcement of the posted speed limit anytime the posted speed limit changes, regardless of the speed of the vehicle. For example, when the user reaches a location where the posted speed limit changes from 45 mph to 55 mph, the speed alert display module 44 may generate a voice announcement for "The speed limit is 55 mph."

In another embodiment, the speed alert display module 44 may generate a voice announcement of the posted speed limit prior to the user reaching a new speed limit zone. For example, if the speed limit alert display module 44 determines that the user is within a predetermined threshold distance of a new speed limit zone (e.g., five hundred feet, one thousand feet, two thousand feet, one mile, etc.) and/or a predetermined threshold duration of the new speed limit zone (e.g., thirty seconds, one minute, two minutes, etc.) based on the map data retrieved at the speed alert server 58, a voice announcement may be generated for "The speed limit will be 45 mph in one mile," or "In thirty seconds, the speed limit will be 45 mph." In this manner, the user may be notified of a change in the posted speed limit before reaching the new speed limit zone. In some embodiments, the user may select the predetermined threshold distance, the predetermined threshold duration, etc., via one or more user controls (not shown) on the user configuration display 400 as shown in FIG. 4A.

In yet another embodiment, the speed alert display module 44 may generate a voice announcement when no speed limit data exists for the user's current location. For example, if the client device 10 cannot connect to the speed alert server 58, the map database 64 does not include a posted speed limit for the user's current location, or the posted speed limit is unavailable for the user's current location for any other suitable reason, a voice announcement may be generated for "Speed data is unavailable for this location."

Figure 4E:
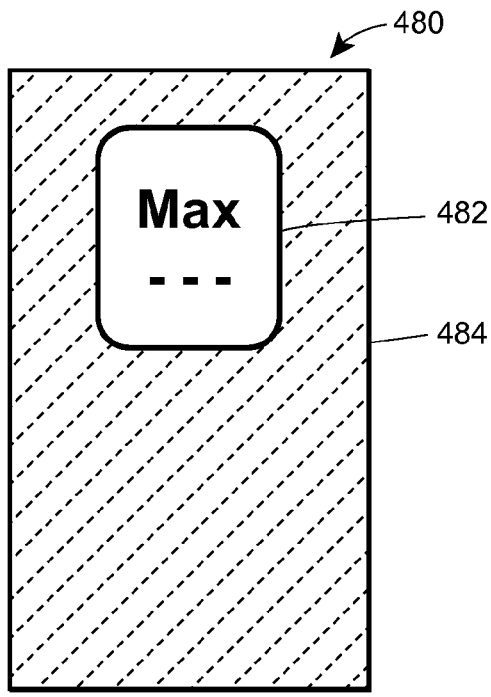
FIG. 4E illustrates a fourth exemplary speed limit alert display of a speed alert application in accordance with the presently described embodiments.

In any event, the user may be able to select scenarios when the audible alert is played, such as when the speed of the vehicle exceeds the speed limit threshold, when the posted speed limit changes or is about to change, when no speed limit data exists as in FIG. 4E, etc., via one or more user controls (not shown) on the user configuration display 400 as shown in FIG. 4A. Furthermore, the user may be able to adjust the volume of the audible alert via a volume slider bar 426 on the user configuration display 400.

Moreover, in addition or as an alternative to the audible alert, the client device 10 may also play a haptic alert. For example, when the speed of the vehicle exceeds the speed limit threshold, the speed alert display module 44 may provide instructions for the vibration motor (not shown) in the client device 10 to vibrate for a predetermined duration (e.g., 5 seconds). Additionally or alternatively, the speed alert display module 44 may also transmit instructions to a second client device 10, such as a wearable computing device (e.g., smart glasses, a smart watch, a smart bracelet, etc.) for the vibration motor (not shown) in the second client device 10 to vibrate for a predetermined duration (e.g., 5 seconds). In other embodiments, the haptic alert may be played when the speed of the vehicle exceeds the posted speed limit, when the posted speed limit changes or is about to change, when there is no speed limit data for the user's current location, or in any other suitable scenario. In some embodiments, the user may be able to select whether and/or when to display/play each of the visual, audible, and haptic alerts.

In an exemplary scenario, the user may select an option for the client device 10 and/or the vehicle head unit 14 to display visual alerts for each speed category, for example via user controls on the user configuration display. The user may also select an option for the client device 10 and/or the vehicle head unit 14 to play the audible alert when the speed of the vehicle exceeds the speed limit threshold, and an option for the client device 10 not to play the haptic alert at all. In another exemplary scenario, the user may select an option for the client device 10 and/or the vehicle head unit 14 to display visual alerts for each speed category. The user may also select an option for the client device 10 and/or the vehicle head unit 14 not to play the audible alert at all, and an option for the client device 10 to play the haptic alert when the speed of the vehicle exceeds the speed limit threshold. In yet another exemplary scenario, the user may select options for the client device 10 and/or the vehicle head unit 14 to play/display each of the visual, audible, and haptic alerts when the speed of the vehicle exceeds the speed limit threshold. Also, in some embodiments, the user may select whether the client device 10 or the vehicle head unit 14 displays/plays the visual and audible alerts, for example via user controls on the user configuration display.

FIG. 4E depicts a fourth exemplary speed limit alert display 480, which may include an indication of the posted speed limit for the user's current location 482, similar to the indications of the posted speed limits as shown in FIGS. 4B-D. The indication 482 may resemble a speed limit sign but may not display a posted speed limit, because the client device 10 cannot connect to the speed alert server 58, the map database 64 communicatively connected to the speed alert server 58 as shown in FIG. 3, does not include a posted speed limit for the user's current location, or the posted speed limit is unavailable for the user's current location for any other suitable reason. The fourth speed limit alert display 480 may also include a gray background color 484, which may correspond to a fourth speed category that there is no speed limit data for the user's current location. For example, if the speed alert display module 44 does not receive a posted speed limit for the user's current location for any of the reasons described above, the speed alert display module 44 may select the gray background color.

The simplicity of each of the alerts creates little to no distraction for the user while notifying her of the posted speed limit as well as the speed of the vehicle compared to the speed limit threshold. For example, the speed limit alert displays 430, 440, 460, and 480 as shown in FIGS. 4B-E, merely include indications of the posted speed limits for the user's current locations and background colors, creating almost no visual clutter.

In an exemplary scenario, John Doe may begin travelling in his vehicle when a speed alert application 41 in his smart watch automatically activates, for example, upon detecting that the smart watch is within range of the vehicle head unit (e.g., the smart watch detects an electronic signal from the vehicle head unit such as a Bluetooth signal, Wi-Fi direct signal, USB, etc.). Assuming, John Doe previously selected 15 mph above the posted speed limit as the speed limit threshold, the smart watch may begin to vibrate when John Doe's vehicle exceeds 15 mph above the posted speed limit. Moreover, the smart watch may also play a beeping sound and announce, "The speed limit is 35 mph." The vehicle head unit may display the posted speed limit with a background color indicating that John Doe has exceeded the speed limit threshold. Based on each of these alerts, John may be made aware of the posted speed limit and his speed in a non-distracting manner. He may then slow down and maintain a speed closer to the posted speed limit, which he otherwise may not have been aware of.

In addition to speed limit alert displays, audible, and visual alerts, the speed alert application 41, and more specifically, the driver history display module 48, may generate and display a driver history display which may include a map of a geographic area including the user's travelled route annotated with speed data such as indications of the vehicle speed compared to the speed limit threshold at different locations on the travelled route. The driver history display may be presented on the client device 10 and/or the display 18 of the vehicle head unit 14. In some embodiments, the driver history display may be presented after a vehicle trip to avoid distraction to the driver. Moreover, in some embodiments, the speed alert application 41 may store several driver history displays (e.g., five driver history displays) for the user's most recent vehicle trips. In this manner, the user may view locations on previously travelled routes where more attention may need to be given to posted speed limits. In other embodiments, the speed alert server 58 may receive and store the driver history displays for the user's most recent vehicle trips.

Figure 5:
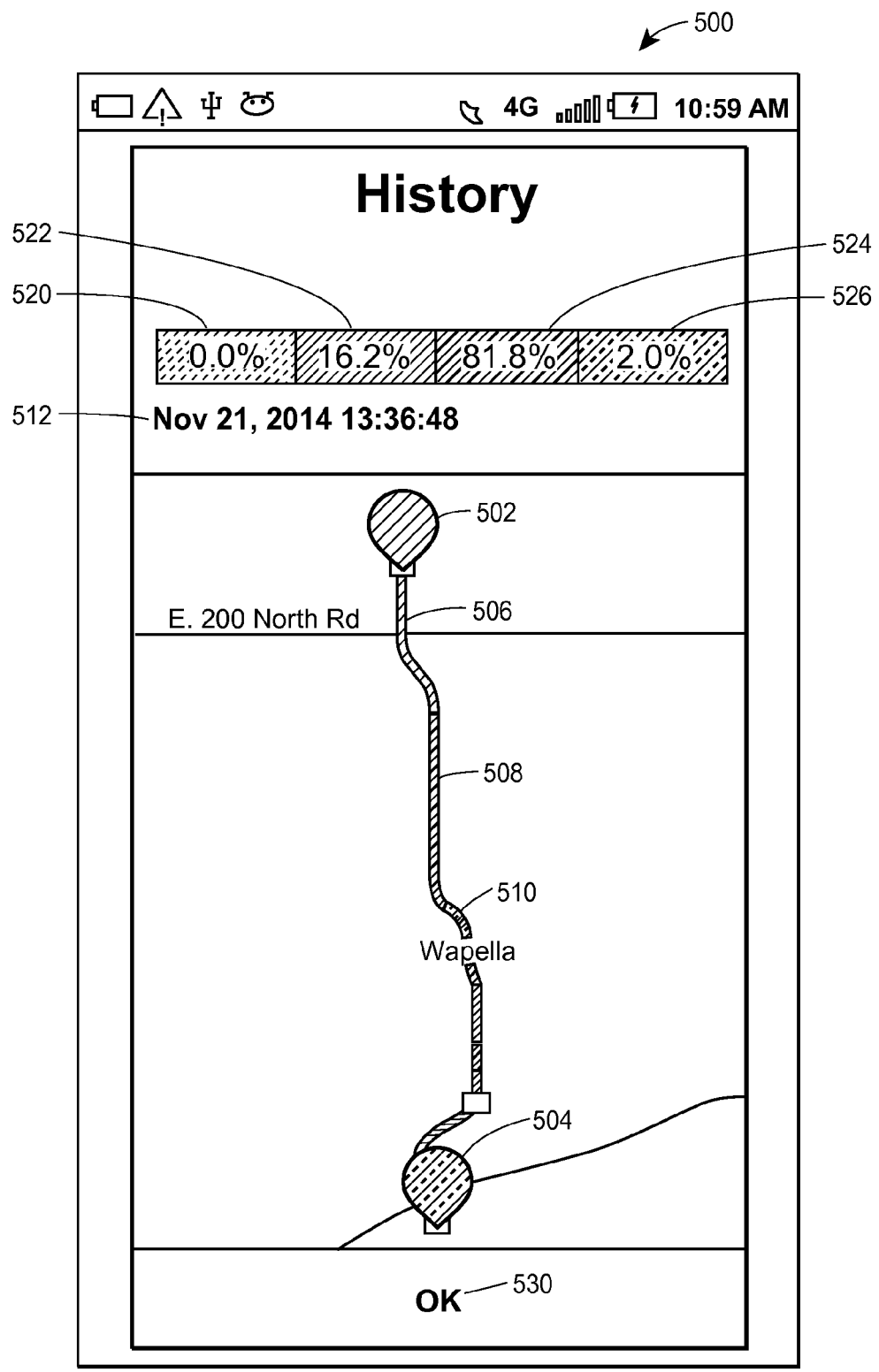
FIG. 5 illustrates an exemplary driver history display of a speed alert application in accordance with the presently described embodiments.

FIG. 5 depicts an exemplary driver history display 500 which may be generated, at least in part by the speed alert server 58 and displayed by the driver history display module 48 of the client device 10, and/or provided to vehicle head unit 14 for display. As will be appreciated by those of ordinary skill in the relevant art(s), the exemplary driver history display 500 shown in FIG. 5 is for illustrative purposes, and the associated functionality may be implemented using any suitable format and/or design for facilitating corresponding described functionalities without departing from the spirit and scope of the present disclosure. In some embodiments, the speed alert server 58 may transmit web pages.

The exemplary driver history display 500 may include the date and time of the vehicle trip 512 and map data for a geographic area including the user's travelled route during the vehicle trip. For example, the driver history display 500 may include a map of a geographic area including a starting location 502 for the vehicle trip, the destination location 504 for the vehicle trip, and several road segments 506, 508, and 510, where each road segment corresponds to a location or several locations of the user on the vehicle trip. For example, the driver history display module 48 may continuously obtain the location of the user during the vehicle trip (e.g., via the GPS sensors 36), or may obtain the location of the user during the vehicle trip after predetermined time intervals (e.g., every 10 seconds, every 30 seconds, every minute, etc.). The driver history display module 48 may transmit the obtained locations to the speed alert server 58 which may obtain map data for the obtained locations via the map database 64, and may generate a map of a geographic area including the user's travelled route. In other embodiments, the speed alert server 58 may generate map data for a geographic area corresponding to the user's travelled route, and the driver history display 500 may generate the map based on the map data.

In any event, the speed alert server 58 may then transmit the generated map or map data to the driver history display module 48 including the starting location 502, the destination location 504, and several road segments 506, 508, and 510. The generated map or map data may also include indications of posted speed limits for each location or road segment on the travelled route. In some embodiments, the speed alert server 58 may transmit an indication of a posted speed limit corresponding to each location transmitted to the speed alert server 58. In other embodiments, the speed alert server 58 may only transmit indications of posted speed limits corresponding to locations in which the posted speed limit has changed from a previous location. For example, if the driver history display module 48 transmits a location, such as mile marker 115 on Highway 230, and receives an indication of a posted speed limit of 55 mph, the driver history display module 48 may not receive another indication of a posted speed limit until transmitting a location, such as mile marker 212, where the posted speed limit changes to 65 mph.

In addition to transmitting the generated map, the speed alert server 58 may transmit indicators which may be overlaid on locations or road segments of the map corresponding to speed categories such as the speed categories described above. For example, each indicator may be a color selected from several colors where a green color may indicate that the user is travelling below the posted speed limit, a yellow color may indicate that the user is travelling above the posted speed limit but below the speed limit threshold, a red color may indicate that the user is travelling above the speed limit threshold, and a gray color may indicate that there is no speed limit data for the corresponding location. In other embodiments, the indicators may be obtained from the client device 10. Also, in other embodiments, additional or alternative colors corresponding to the speed categories may be included. Moreover, additional or alternative colors may also be included which correspond to additional speed categories.

In any event, the driver history display module 48 may continuously determine and record the speed of the vehicle for each obtained location or road segment on the travelled route (e.g., via the GPS sensors 36, the accelerometer 46, and/or the gyroscope). For each obtained location or road segment on the travelled route, the driver history display module 48 may select one of the indicators to place over the location or road segment based on the speed of the vehicle at the location or road segment, the posted speed limit for the location or road segment, and the speed limit threshold. For example, a green color indicator overlays road segment 506 indicating that the user travelled below the posted speed limit for road segment 506, a yellow color indicator overlays road segment 508 indicating that the user travelled above the posted speed limit, but below the speed limit threshold for road segment 508, and a red color indicator overlays road segment 510 indicating that the user travelled above the speed limit threshold for road segment 510. In some embodiments, a different color indicator may overlay each consecutive road segment, such as road segments 506 and 508, such that a road segment may have a different color indicator as the previous road segment on the travelled route. Also, in some embodiments, a road segment may be one or several consecutive locations on the travelled route which correspond to the same speed category. For example, road segment 508 may include thirty consecutive locations on the travelled route which correspond to the second speed category (e.g., that the user travelled above the posted speed limit but below the speed limit threshold at each of the thirty consecutive locations).

While the driver history display 500 includes four indications corresponding to speed categories, this is merely for ease of illustration only. The driver history display 500 may include any suitable number of indications, any suitable number of speed categories, and each indication may be any suitable color or any other suitable indication of a speed category.

In some embodiments, the driver history display module 48 may place an indicator over each location on the travelled route. In other embodiments, the driver history display module 48 may select an indicator for a first location based on the speed of the vehicle at the location, the posted speed limit for the location, and the speed limit threshold. The driver history display module 48 may place the selected indicator over each consecutive location on the map in which the user travelled at the same speed category.

For example, road segment 506 may include twenty locations (Locations 1-20) obtained by the driver history display module 48. For Location 1, the driver history display module 48 may determine a vehicle speed of 30 mph, a posted speed limit of 45 mph, and a speed limit threshold of 10 mph above the posted speed limit. As a result, the driver history display module 48 may determine that the speed of the vehicle is less than the posted speed limit and may select the green indicator. For Locations 2-20, the driver history display module 48 may also determine that the vehicle speed is less than the posted speed limit. At Location 21, corresponding to road segment 508, the driver history display module 48 may determine a vehicle speed of 30 mph, a posted speed limit of 25 mph, and a speed limit threshold of 10 mph above the posted speed limit. As a result, the driver history display module 48 may determine that the speed of the vehicle is above the posted speed limit, but below the speed limit threshold and may select the yellow indicator. The driver history display module 48 may then place the green indicator over each of locations 1-20 corresponding to road segment 506 on the driver history display 500.

Additionally, the driver history display 500 may include statistical data based on the speed of the vehicle for the vehicle trip. For example, the driver history display 500 may include indications of the likelihood that the user travelled in each speed category during the vehicle trip. The likelihood indications may be percentages, probabilities, ratios, or any other suitable likelihood indications and may include color indicators to denote corresponding speed categories. For example, the first likelihood indication 520 includes a gray color which may indicate that there was no speed limit data for 0.0% of the vehicle trip. The second likelihood indication 522 includes a green color which may indicate the user travelled below the posted speed limit for 16.2% of the vehicle trip, the third likelihood indication 524 includes a yellow color which may indicate the user travelled above the posted speed limit, but below the speed limit threshold for 81.8% of the vehicle trip, and the fourth likelihood indication 526 includes a red color which may indicate the user travelled above the speed limit threshold for 2.0% of the vehicle trip. The percentages, probabilities, ratios, etc., may be based on distance or duration. For example, the second likelihood indication 522 may indicate that the user travelled below the posted speed limit for 16.2% of the total duration of the vehicle trip. Alternatively, the second likelihood indication 522 may indicate that the user travelled below the posted speed limit for 16.2% of the total distance for the vehicle trip. After viewing this display, the user may realize that he is speeding a large majority of the time, 83.8%, and may take corrective action to reduce his likelihood of speeding.

Based on the statistical data, and the color indicators which may be placed on the map of the user's travelled route, the user may review and analyze previously travelled routes to see how likely he is to exceed the posted speed limit and/or the speed limit threshold, and to see locations where he is most likely to exceed posted the speed limit and/or the speed limit threshold. For example, on some highways there may be a dramatic decrease in the posted speed limit when approaching a traffic signal (e.g., from 65 mph to 45 mph). Many drivers may not notice the dramatic decrease, but by viewing the driver history display 500, the user may recognize this decrease and may slow down accordingly before approaching the 45 mph speed limit. In other embodiments, the driver history display 500 may include additional or alternative statistical data, such as the likelihood that the user travelled in each speed category for all previous vehicle trips, an average speed of the user above or below the posted speed limit, an average speed of the user above or below the posted speed limit for a particular time of day or year, etc.

In some embodiments, the speed alert server 58 may receive and store the statistical data for the user. Moreover, users may select an option to opt-in to share statistical data amongst other users of the speed alert system. In this scenario, statistical data for users who opted in may be compared by the speed alert server 58, and users may receive notifications of their driver histories as compared to other users. For example, the speed alert server 58 may determine that while the user was speeding 83.8% of the time, on average users speed 50% of the time, and as a result, the speed alert server 58 may transmit a notification to the client device 10 that the user speeds more often than 76% of users.

Figure 6:
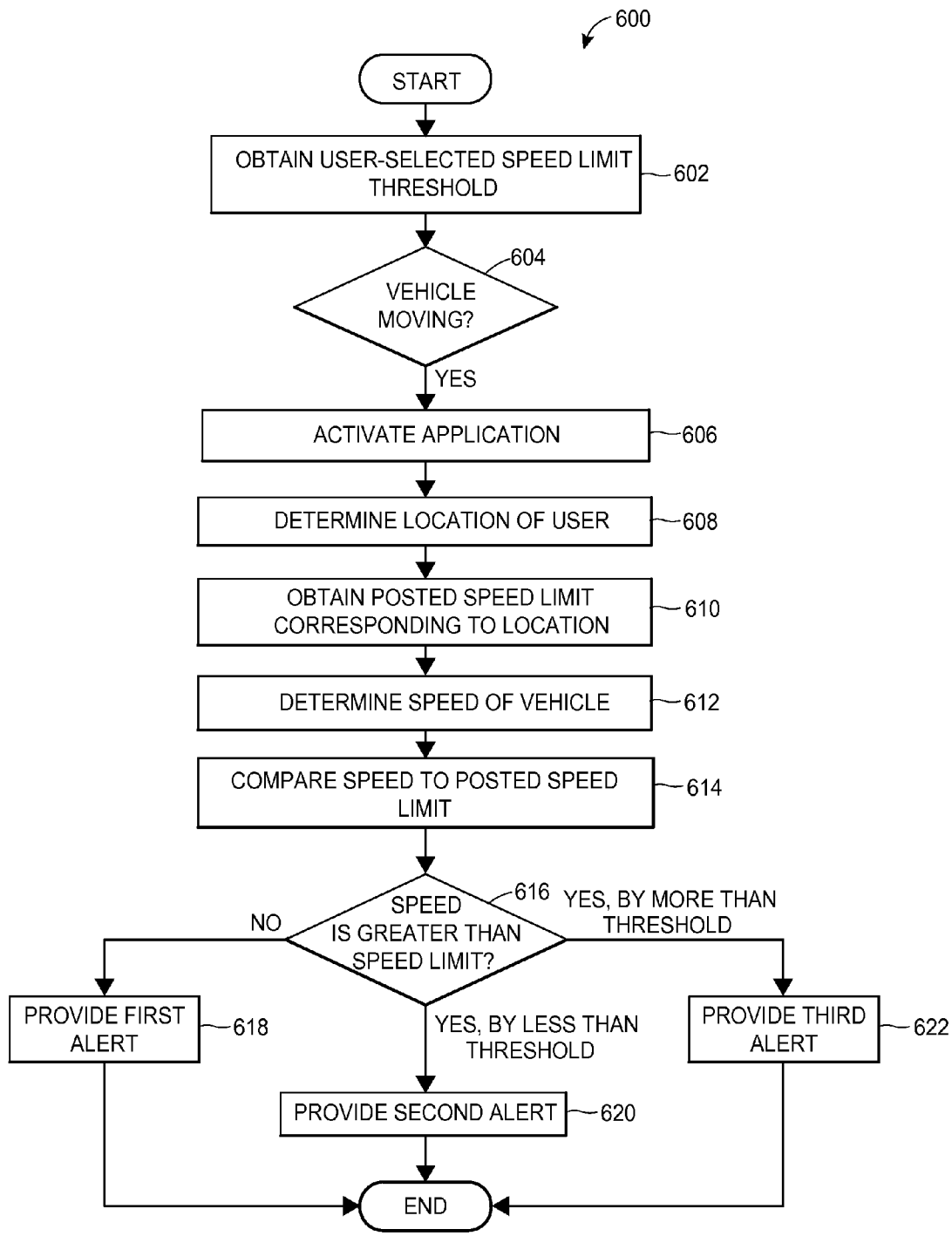
FIG. 6 illustrates a flow diagram representing an exemplary method for providing speed limit alerts in accordance with the presently described embodiments.

FIG. 6 depicts a flow diagram representing an exemplary method 600 for providing speed limit alerts. The method 600 may be executed on the client device 10. In some embodiments, the method 600 may be implemented in a set of instructions stored on a non-transitory computer-readable memory and executable on one or more processors of the client device 10. For example, the method 600 may be performed by the speed alert application 41, and at least partially performed by the speed alert display module 44 as shown in FIG. 2.

At block 602, a user-selected speed limit threshold may be obtained, for example via the user configuration display 400 as shown in FIG. 4A. The user may select a single speed limit threshold such as "15 mph above the speed limit," for all posted speed limits, or the user may select several speed limit thresholds each corresponding to a particular posted speed limit or speed limit range. For example, the user may select a first speed limit threshold of "5 mph above the speed limit," for all posted speed limits less than 45 mph, and a second speed limit threshold of "10 mph above the speed limit," for all posted speed limits at or above 45 mph.

In any event, the selected speed limit threshold may be stored at the client device 10 for comparing to the speed of the vehicle and the posted speed limit. If the user selects several speed limit thresholds each corresponding to a particular speed limit range, then the client device 10 may compare the speed of the vehicle to the posted speed limit and the speed limit threshold corresponding to the speed limit range which includes the posted speed limit. In the example described above, if the posted speed limit is less than 45 mph, the client device 10 may compare the speed of the vehicle to the posted speed limit and the first speed limit threshold of "5 mph above the speed limit." On the other hand, if the posted speed limit is at or above 45 mph, the client device 10 may compare the speed of the vehicle to the posted speed limit and the second speed limit threshold of "10 mph above the speed limit."

In any event, if the client device 10 detects a speed which exceeds a predetermined threshold (e.g., 10 mph), the client device 10 may determine that the client device 10 is in a moving vehicle and may automatically activate the speed alert application (block 606). In other embodiments, the speed alert application 41 may automatically activate when the client device 10 detects an electronic signal from the vehicle head unit 14, for example via the short-range communication unit 30A, such as a Bluetooth signal, Wi-Fi direct signal, USB, etc. In yet another embodiment, the speed alert application 41 may automatically activate when the client device 10 detects a speed above the predetermined threshold and the client device 10 is within range of the vehicle head unit 14.

Upon activation, the client device 10 may determine a current location of the user (block 608), via the GPS sensors 36 in the client device 10 or the GPS sensors 28 in the vehicle head unit 14. The client device 10 may then transmit the current location to the speed alert server 58, which may in turn retrieve map data for the current location from a map database 64 which may include the posted speed limit for the current location. The posted speed limit may then be obtained from the speed alert server 58 (block 610). In some embodiments, the speed alert server 58 may also transmit a speed limit alert display or at least a portion of a speed limit alert display, including an indication of the posted speed limit and several background colors each corresponding to a different speed category, to be presented on the client device 10. The speed alert display module 44 may then select one of the background colors and present the speed limit alert display on the client device 10 as a visual alert.

In any event, at block 612, the client device 10 may determine the speed of the vehicle via the GPS sensors 36, the accelerometer 46, and/or the gyroscope in the client device 10 or the GPS sensors and/or IMU 28 in the vehicle head unit 14. The speed of the vehicle may then be compared to the posted speed limit, and the speed limit threshold (block 614) to determine a speed category. For example, a first speed category may correspond to speeds that are less than the posted speed limit, a second speed category may correspond to speeds greater than the posted speed limit, but less than the speed limit threshold, and a third speed category may correspond to speeds greater than the speed limit threshold.

If the speed of the vehicle is less than the posted speed limit, the speed alert display module 44 may generate and display a first visual alert (block 618) on the client device 10 and/or the vehicle head unit 14. The first visual alert may be similar to the first exemplary speed limit alert display 430 as shown in FIG. 4B, and may include an indication of the posted speed limit for the user's current location, and a background color such as a green background color which corresponds to the first speed category.

If the speed of the vehicle is above the posted speed limit, but below the speed limit threshold, the speed alert display module 44 may generate and display a second visual alert (block 620) on the client device 10 and/or the vehicle head unit 14. The second visual alert may be similar to the second exemplary speed limit alert display 440 as shown in FIG. 4C, and may include an indication of the posted speed limit for the user's current location, and a background color such as a yellow background color which corresponds to the second speed category.

Moreover, if the speed of the vehicle is above the speed limit threshold, the speed alert display module 44 may generate and display a third visual alert (block 622) on the client device 10 and/or the vehicle head unit 14. The third visual alert may be similar to the third exemplary speed limit alert display 460 as shown in FIG. 4D, and may include an indication of the posted speed limit for the user's current location, and a background color such as a red background color which corresponds to the third speed category. In some embodiments, the speed alert display module 44 may play an audible and/or a haptic alert on the client device 10 and/or the vehicle head unit 14, when the speed of the vehicle is above the speed limit threshold.

The audible alert may be a sound such as a ringtone, a beep, an engine revving noise, a custom audio clip recorded by the user, etc., followed by a voice announcement of the posted speed limit. For example, the speed alert display module 44 may include a text-to-speech engine, which generates a voice announcement for "The speed limit is 30 mph." The haptic alert may be a vibration of the vibration motor in the client device 10. For example, the speed alert display module 44 may provide instructions for the vibration motor in the client device 10 to vibrate for a predetermined duration (e.g., 5 seconds).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as exemplary only and does not describe every possible embodiment, as describing every possible embodiment would be impractical, if not impossible. One could implement numerous alternate embodiments, using either current technology or technology developed after the filing date of this application.

We claim:

1. A computer-implemented method for providing speed limit alerts in a vehicle, the method executed by one or more processors programmed to perform the method, the method comprising:
   obtaining, at one or more processors at a client device, an indication of a threshold speed above a posted speed limit for providing an alert to a user;
   determining, by the one or more processors, a current location of the user when the user is travelling in a vehicle on a vehicle trip;
   obtaining, at the one or more processors, a posted speed limit for the vehicle based on the current location of the user;
   determining, by the one or more processors, a speed of the vehicle;
   when the vehicle exceeds the threshold speed above the posted speed limit:
      providing, by the one or more processors, an audible alert to the user; and
      providing, by the one or more processors, a visual alert to the user, wherein the visual alert includes a display on a user interface with an indication that the vehicle is exceeding the threshold speed above the posted speed limit; and
   providing, by the one or more processors, a map display to the user including map data corresponding to a route in which the user previously travelled during the vehicle trip, wherein the map display includes an indication of a proportion of a duration or distance of the route in which the user travelled above the posted speed limit;
   wherein the method is automatically initiated when the user begins travelling in the vehicle.

2. The method of claim 1, wherein the indication that the vehicle is exceeding the threshold speed above the posted speed limit is a first indication and wherein determining a speed of the vehicle includes continuously recording, by the one or more processors, the speed of the vehicle during the vehicle trip, and
   wherein providing the map display to the user includes for each of a plurality of locations on the route, providing, by the one or more processors, a second indication of the speed of the vehicle at the location relative to the posted speed limit for the location, wherein the second indication overlays the location on the map display.

3. The method of claim 2, wherein the second indication is a color selected from a plurality of colors, wherein each of the plurality of colors represents a different speed category from a set of speed categories including below the posted speed limit, above the posted speed limit and below the threshold speed above the posted speed limit, and above the threshold speed above the posted speed limit.

4. The method of claim 1, wherein the indication of the threshold speed is a first threshold speed, the method is a first method, and wherein to automatically initiate the first method when the user begins travelling in the vehicle, a second method executed by one or more processors programmed to perform the second method comprises:
   comparing, by the one or more processors, the speed of the vehicle to a second threshold speed;
   determining, by the one or more processors, whether the client device is within range of an onboard computing device of the vehicle by detecting an electronic signal from the onboard computing device; and
   when at least one of: (i) the speed of the vehicle exceeds the second threshold speed or (ii) the client device is within range of the onboard computing device of the vehicle, automatically initiating the first method.

5. The method of claim 1, wherein the audible alert includes an electronic voice announcement of the posted speed limit.

6. The method of claim 1, wherein obtaining an indication of a threshold speed above a posted speed limit includes obtaining, by the one or more processors at the client device, a plurality of indications of threshold speeds above the posted speed limit from the user, wherein each of plurality of indications corresponds to a speed limit range, and further comprising:
   comparing, by the one or more processors, the speed of the vehicle to the posted speed limit for the vehicle and a threshold speed of the plurality of threshold speeds above the posted speed limit corresponding to a speed limit range which includes the posted speed limit; and
   determining, by the one or more processors, that the vehicle exceeds the threshold speed above the posted speed limit based on the comparison.

7. The method of claim 1, wherein providing, by the one or more processors, a visual alert to the user comprises providing, by the one or more processors, the visual alert to be displayed on an onboard computing device of the vehicle.

8. The method of claim 1, wherein when the vehicle exceeds the threshold speed above the posted speed limit, the method further comprises providing, by the one or more processors, a haptic alert to the user wherein the haptic alert, includes a vibration of the client device for a predetermined duration.

9. The method of claim 1, wherein the visual alert is a first visual alert, the indication is a first indication, and further comprising:
   when the vehicle does not exceed the threshold speed above the posted speed limit and the vehicle exceeds the posted speed limit:
      providing, by the one or more processors, a second visual alert to the user, wherein the second visual alert includes a display on the user interface with a second indication that the vehicle does not exceed the threshold speed above the posted speed limit and the vehicle exceeds the posted speed limit; and
   when the vehicle does not exceed the posted speed limit:
      providing, by the one or more processors, a third visual alert to the user, wherein the third visual alert includes a display on the user interface with a third indication that the vehicle does not exceed the posted speed limit.

10. The method of claim 9, wherein each of the first, second, and third indications corresponding to the respective first, second, and third visual alerts are a different background color on the display from a set of background colors, and wherein each indication includes a display of the posted speed limit at the current location of the user.

11. A client device for providing speed limit alerts in a vehicle, the client device comprising:
   one or more processors;
   a communication network;
   a user interface;
   a non-transitory computer-readable memory coupled to the one or more processors, the communication network, and the user interface, and storing thereon instructions that, when executed by the one or more processors, cause the client device to:
  obtain an indication of a threshold speed above a posted speed limit for providing an alert to a user;
  determine a current location of the user when the user is travelling in a vehicle on a vehicle trip;
  obtain, via the communication network, a posted speed limit for the vehicle based on the current location of the user;
  determine a speed of the vehicle;
  when the vehicle exceeds the threshold speed above the posted speed limit:
    provide an audible alert to the user; and
    provide a visual alert to the user, wherein the visual alert includes a display on the user interface with an indication that the vehicle is exceeding the threshold speed above the posted speed limit; and
  provide a map display to the user including map data corresponding to a route in which the user previously travelled during the vehicle trip, wherein the map display includes an indication of a proportion of a duration or distance of the route in which the user travelled above the posted speed limit;
  wherein the instructions are automatically executed by the one or more processors on the client device when the user begins travelling in the vehicle.

12. The client device of claim 11, wherein the indication that the vehicle is exceeding the threshold speed above the posted speed limit is a first indication and wherein to determine a speed of the vehicle, the instructions cause the client device to continuously record the speed of the vehicle during the vehicle trip, and
  wherein to provide the map display to the user, the instructions cause the client device to: for each of a plurality of locations on the route, provide a second indication of the speed of the vehicle at the location relative to the posted speed limit for the location, wherein the second indication overlays the location on the map display.

13. The client device of claim 12, wherein the second indication is a color selected from a plurality of colors, wherein each of the plurality of colors represents a different speed category from a set of speed categories including below the posted speed limit, above the posted speed limit and below the threshold speed above the posted speed limit, and above the threshold speed above the posted speed limit.

14. The client device of claim 11, wherein the indication of the threshold speed is a first threshold speed, wherein the instructions executed by the one or more processors are a first set of instructions and wherein to automatically execute the first set of instructions on the client device when the user begins travelling in the vehicle, a second set of instructions are stored in the non-transitory computer-readable memory that, when executed by the one or more processors, cause the client device to:
  compare the speed of the vehicle to a second threshold speed;
  determine whether the client device is within range of an onboard computing device of the vehicle by detecting, via the communication network, an electronic signal from the onboard computing device; and
  when at least one of: (i) the speed of the vehicle exceeds the second threshold speed or (ii) the client device is within range of the onboard computing device of the vehicle, cause the first set of instructions to automatically be executed by the one or more processors on the client device.

15. The client device of claim 11, wherein the audible alert includes an electronic voice announcement of the posted speed limit.

16. The client device of claim 11, wherein to obtain an indication of a threshold speed above a posted speed limit, the instructions cause the client device to obtain a plurality of indications of threshold speeds above the posted speed limit from the user, wherein each of plurality of indications corresponds to a speed limit range, and the instructions further cause the client device to:
  compare the speed of the vehicle to the posted speed limit for the vehicle and a threshold speed of the plurality of threshold speeds above the posted speed limit corresponding to a speed limit range which includes the posted speed limit; and
  determine that the vehicle exceeds the threshold speed above the posted speed limit based on the comparison.

17. The client device of claim 11, wherein the instructions further cause the client device to provide the visual alert to be displayed on an onboard computing device of the vehicle.

18. The client device of claim 11, wherein when the vehicle exceeds the threshold speed above the posted speed limit, the instructions further cause the client device to provide a haptic alert to the user, wherein the haptic alert includes a vibration of the client device for a predetermined duration.

19. The client device of claim 11, wherein the visual alert is a first visual alert, the indication is a first indication, and the instructions further cause the client device to:
  when the vehicle does not exceed the threshold speed above the posted speed limit and the vehicle exceeds the posted speed limit:
    provide a second visual alert to the user, wherein the second visual alert includes a display on the user interface with a second indication that the vehicle does not exceed the threshold speed above the posted speed limit and the vehicle exceeds the posted speed limit; and
  when the vehicle does not exceed the posted speed limit:
    provide a third visual alert to the user, wherein the third visual alert includes a display on the user interface with a third indication that the vehicle does not exceed the posted speed limit.

20. The client device of claim 19, wherein each of the first, second, and third indications corresponding to the respective first, second, and third visual alerts are a different background color on the display from a set of background colors, and wherein each indication includes a display of the posted speed limit at the current location of the user.

* * * * *